(12) United States Patent
Braun

(10) Patent No.: US 11,479,337 B1
(45) Date of Patent: Oct. 25, 2022

(54) AIRPLANE PASSENGER DOOR RAPID EMERGENCY EGRESS SYSTEM

(71) Applicant: KArl Braun, Fairbanks, AK (US)

(72) Inventor: KArl Braun, Fairbanks, AK (US)

( * ) Notice: Subject to any disclaimer, the term of this patent is extended or adjusted under 35 U.S.C. 154(b) by 27 days.

(21) Appl. No.: 17/339,158

(22) Filed: Jun. 4, 2021

Related U.S. Application Data

(60) Provisional application No. 63/039,115, filed on Jun. 15, 2020.

(51) Int. Cl.
*B64C 1/32* (2006.01)

(52) U.S. Cl.
CPC ..................... *B64C 1/32* (2013.01)

(58) Field of Classification Search
CPC ....................................... B64C 1/32
See application file for complete search history.

(56) References Cited

U.S. PATENT DOCUMENTS 2,346,977 A * 4/1944 Stanley ................. B64C 3/00
244/129.5
2004/0144894 A1 * 7/2004 Paradis ..................... B64C 1/32
244/129.4
2014/0259935 A1 * 9/2014 Steger ................... B64C 1/1423
49/141

FOREIGN PATENT DOCUMENTS

EP        3100947 A1 * 12/2016 ........... B64C 1/1492

* cited by examiner

*Primary Examiner* — Richard G Davis
(74) *Attorney, Agent, or Firm* — Michael J. Tavella

(57) ABSTRACT

A passenger door rapid emergency egress (PDREE) system that can be used on airplanes, such as the Cessna 206, allows the forward cargo door to be safely jettisoned allowing unrestricted egress for occupants in the rear of the aircraft. Unlike the manufacturer's design, the (PDREE) system is designed to work when the landing flaps are down. Extended flaps interfere with the exit door. Mechanical levers in the PDREE system are designed to function even if used improperly. The PDREE system opens and allows the passenger door to be jettisoned when the door is closed, or closed and locked, and binding loads are placed on the hinges. This is accomplished through the use of robust, non-corrosive, stainless steel mechanical levers and pins. A separate, red emergency handle safely stowed to prevent accidental activation, is easily accessible in the back of the aircraft.

10 Claims, 13 Drawing Sheets

AIRPLANE PASSENGER DOOR RAPID EMERGENCY EGRESS SYSTEM

CROSS REFERENCE TO RELATED APPLICATIONS

This application claims benefit of Provisional application 63/039,115 filed Jun. 15, 2020.

STATEMENT REGARDING FEDERALLY SPONSORED RESEARCH AND DEVELOPMENT

Not Applicable

BACKGROUND OF THE INVENTION

1. Field of the Invention

This invention relates to passenger doors for airplanes and particularly to airplane passenger door rapid emergency egress systems.

2. Description of the Prior Art

The Cessna 206, for example, has had a long-standing design flaw that does not allow rapid egress for the occupants in the rear of the aircraft. When the Cessna 206 landing flaps are deployed in the landing configuration, the rear passenger door is obstructed virtually trapping the rear occupants inside the aircraft. When the aircraft is equipped with floats this design flaw is exaggerated to a known hazard in a water upset. The current emergency egress procedure Cessna has designed and certified has already been identified as contributing factor in passenger death by drowning due to the inability to egress the aircraft timely.

BRIEF DESCRIPTION OF THE INVENTION

The instant invention overcomes this problem. The passenger door rapid emergency egress (PDREE) system that can be used on airplanes, such as the Cessna 206, allows the forward cargo door to be safely jettisoned allowing unrestricted egress for occupants in the rear of the aircraft.

Door jettison devices are commonplace in helicopter and fixed wing aerobatic aircraft for crewmember seats only. Despite the inherent safety risks, especially for float operations that can trap occupants underwater, door jettison systems to assist passenger egress are non-existent for aircraft operated in the Normal and Utility category.

The PDREE system is a door jettison system for Normal and Utility category aircraft designed to allow occupants other than crewmembers rapid egress in the event of a crash. Unlike the manufacturer's design, the (PDREE) system is designed to work when the landing flaps are down. Extended flaps interfere with the exit door. Thus, for example, in a crash landing, this door is effectively blocked. The PDREE system is a simple, safe, stand-alone construction that provides unrestricted egress by removing the forward door pins allowing the door to be jettisoned from the door frame. Mechanical levers in the PDREE system are designed to function even if used improperly. The PDREE system opens and allows the passenger door to be jettisoned when the door is closed, or closed and locked, and binding loads are placed on the hinges. This is accomplished through the use of robust, non-corrosive, stainless steel mechanical levers and pins.

Other door jettison systems function under minimal hinge binding load, after the door has been partially opened unloading the binding force on the hinges and thereby allowing the hinges to be removed and the door and jettisoned.

The PDREE system is different and safer in that it does both. The PDREE system functions in conjunction with the original equipment emergency exit or as a stand-alone PDREE System. A separate, red emergency handle safely stowed to prevent accidental activation, is easily accessible to all four non-crewmember occupants in the back of the aircraft. Panicked passengers now have every available possibility to escape from being trapped inside the air frame if the flaps are down.

DETAILED DESCRIPTION OF THE INVENTION

Figure 1:
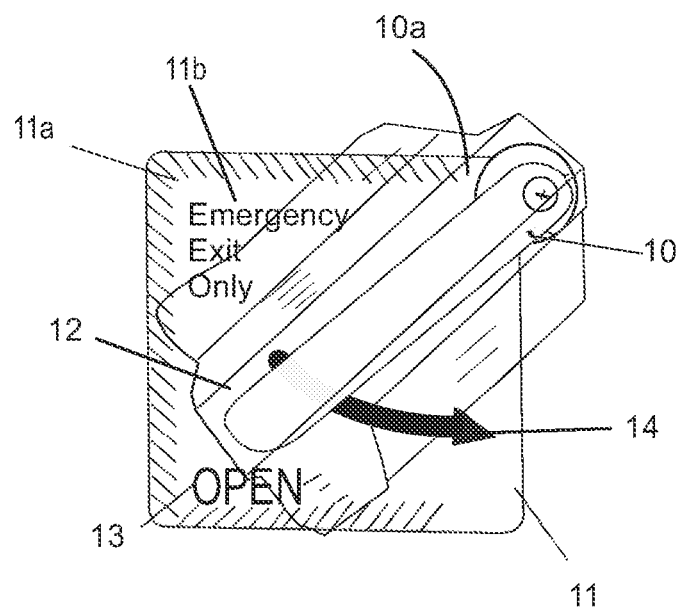
FIG. 1 is a front view of the emergency interior door handle in the normally safe configuration.

Referring to the drawings, the PDREE system is described as follows.

Figure 2:
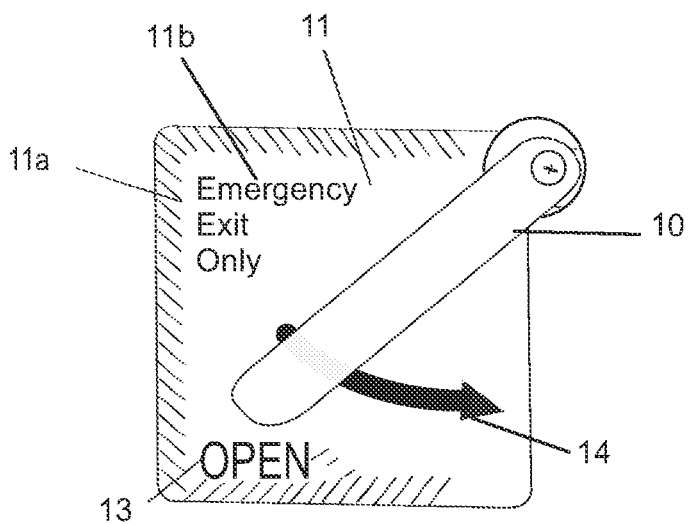
FIG. 2 is a front view of the emergency interior door handle in the normally safe configuration and the safety cover removed.
Figure 3:
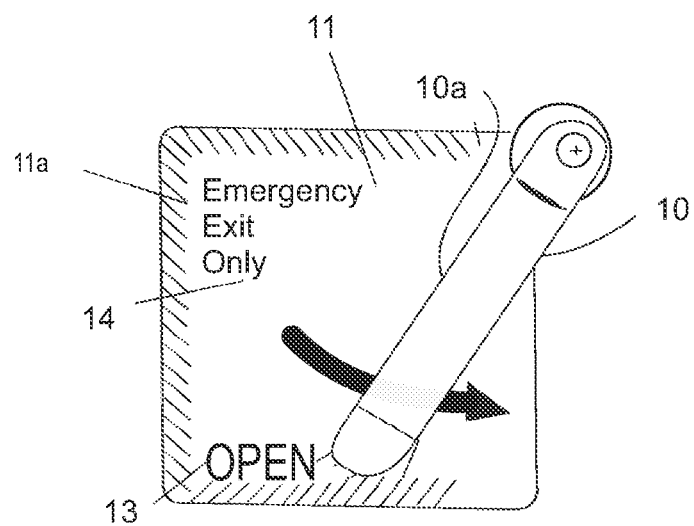
FIG. 3 is a front view of the emergency interior door handle in the fully open and release position.
Figure 1A:
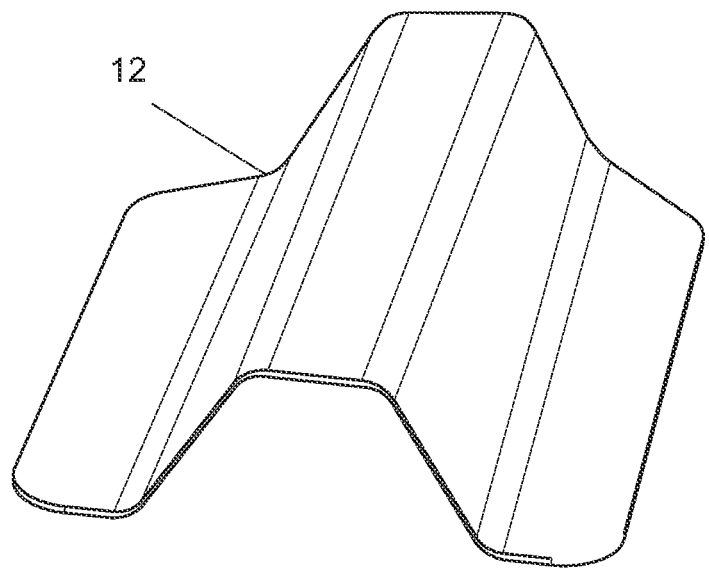
FIG. 1a is a perspective view of the clear cover for the emergency interior door handle.

FIG. 1 is a front view of the emergency interior door handle in the normally safe configuration. The PDREE system has both interior and exterior components. FIGS. 1-3 show the main interior components. FIG. 1 shows the interior handle 10 mounted on shaft (see FIG. 12). The handle 10 is shown in the normal, safe mode in this figure. Note that there is a removable plastic cover 12 that is shown in FIG. 1a. This cover protects the handle and prevents it from accidently being moved due to incidental contact. The handle 10 has a placard 11 behind it that bears word "OPEN" 13 and an arrow 14, both in red, indicating how the handle 10 is to be used. In the preferred embodiment, the placard 11 is painted white. One-half inch red hash marks 11a are painted around the perimeter as shown. The handle 10 is painted red. The words "Emergency Exit Only"10a on the placard 11 are also in red.

FIG. 2 is a front view of the emergency interior door handle in the normally safe configuration and the safety cover 12 removed. The handle 10, the arrow 14 and the "OPEN" indication 13 are clearly visible.

FIG. 3 is a front view of the emergency interior door handle in the fully open and release position. Here, the handle 10 has been rotated in an emergency. The handle 10 is attached to an exterior actuator arm 18 (see FIG. 11) by a pivot shaft 19 (see FIG. 12), which activated the external components to release the door, as discussed below. See also, FIG. 19.

Figure 4:
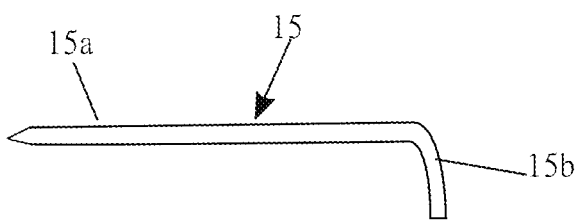
FIG. 4 is a side view of one of the door pins.

FIGS. 4-11 show the exterior components of the system. FIG. 4 is a side view of one of the door pins 15 as noted above, these components are made of non-corrosive, stainless steel. Note that the pin 15 is bent having a straight portion 15 and an orthogonal portion 15b. Two pins 15 are needed for the device.

Figure 5:
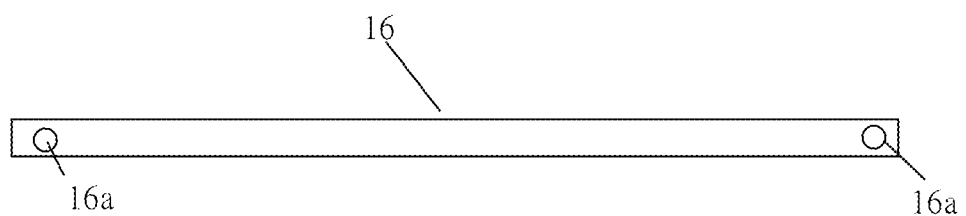
FIG. 5 is a front view of the release bar unassembled.

FIG. 5 is a front view of the release bar unassembled. This view shows the release bar 16, which for a Cessna 206, is 20.25 inches long. This is enough to span the distance between the hinges of a typical Cessna 206. Of course, for other aircraft, these dimensions can be changed to fit as needed. Note the two circles 16a indicate weld points for the two pins 15. See FIG. 8 below.

Figure 6:
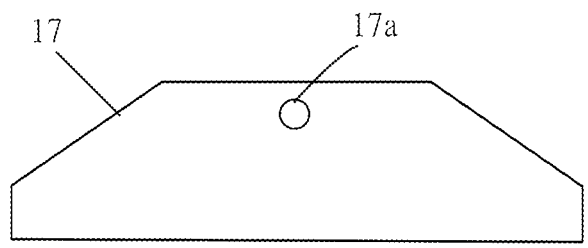
FIG. 6 is a front view of the door shaft activator bracket.
Figure 7:
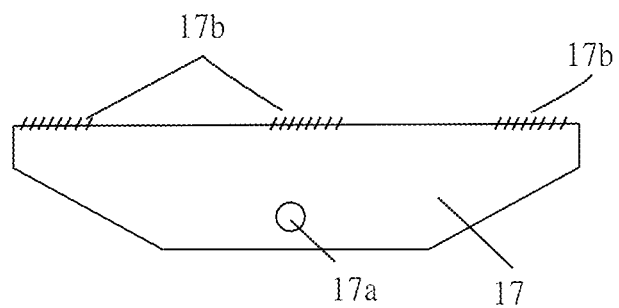
FIG. 7 is front view of the door shaft activator bracket showing welding details for assembly to the release bar.

FIG. 6 is a front view of the door shaft activator bracket 17. In the preferred embodiment, the bracket is shaped as shown. A hole 17a is used to attach the exterior actuator arm. FIG. 7 is front view of the door shaft activator bracket 17 showing welding details for assembly to the release bar. In the preferred embodiment, the door shaft activator bracket 17 is welded to the release bar 16 (see FIG. 8) with welds 17b. The bracket 17 can be considered as a means for holding the exterior actuator arm.

Figure 8:
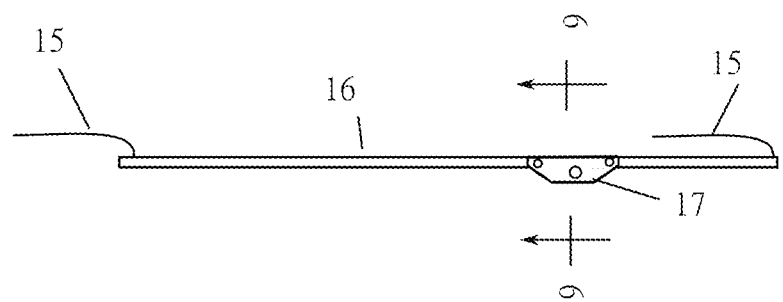
FIG. 8 is a detail of the assembled outer door pin-bar assembly.

FIG. 8 is a detail of the assembled outer door pin-bar assembly. Here, the release bar 16 is shown with the pins 15 attached. Note how the orthogonal portion 15b is used to offset the pin 15 from the release bar. This allows the pins 15 to be seated in the hinges while not causing the release bar 16 to bind on them. Note too, the position of the door shaft activator bracket 17. The position of the door shaft activator bracket 17 is critical because it connects to the exterior actuator arm 18, which in turn connects to the handle 10 inside the plane.

Figure 9:
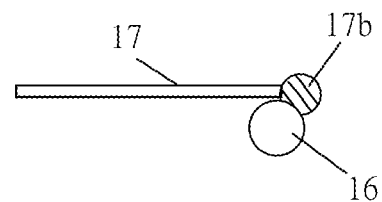
FIG. 9 is a detail view of the door pin shaft alignment taken along the lines 9-9 of FIG. 8.

FIG. 9 is a detail view of the door pin shaft alignment taken along the lines 9-9 of FIG. 8. Here, the door shaft activator bracket 17 is shown welded to the release bar 16 with a weld 17b.

Figure 10:
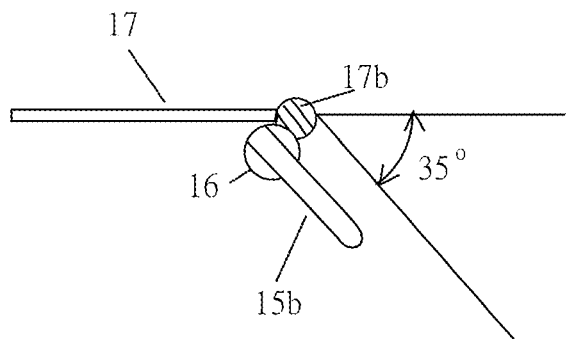
FIG. 10 is a detail view of the door pin shaft alignment.

FIG. 10 is a detail view of the door pin shaft alignment. Here, FIG. 9 is reproduced as above, with the door shaft activator bracket 17 is shown welded to the release bar 16 with a weld 17b. In addition, one of the pins 15 (the orthogonal portion 15b showing how the pin is offset from the release bar 16) is shown attached at a 35° angle to the door shaft activator bracket 17. This angle allows the pins to be placed in the hinges and for the bracket to be properly aligned with the exterior actuator arm 18, as discussed below.

Figure 11:
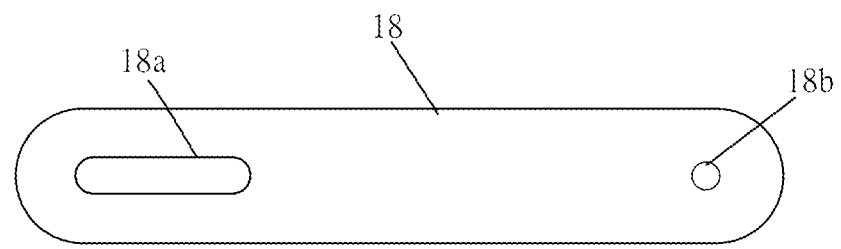
FIG. 11 is a front view of the exterior actuator arm.

FIG. 11 is a front view of the exterior actuator arm 18. The exterior actuator arm has an elongated slot 18a and a hole 18b. The slot allows the exterior actuator arm 18 to be attached to the door shaft activator bracket 17. The hole 18b allows the exterior actuator arm to be attached to the pivot shaft 19. The slot 18a allows the position of the exterior actuator arm to be adjusted as needed to fit. The exterior actuator arm is attached to the door shaft activator bracket 17 by a fastener. Similarly, the exterior actuator arm 18 is attached to the pivot shaft by a screw, 18c (see FIG. 19).

Figure 12:
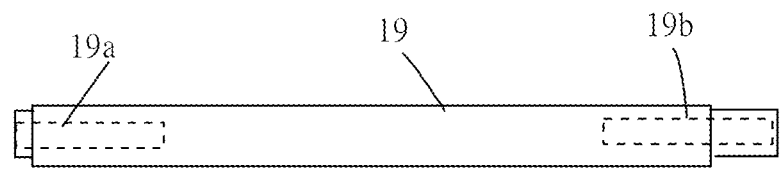
FIG. 12 is a detail view of a pivot shaft that connects the interior handle to the exterior actuator arm.

FIG. 12 is a detail view of a pivot shaft 19 that connects the interior handle to the exterior actuator arm. The pivot shaft 19 is designed to pass through the fuselage. And to connect the exterior actuator arm 18 to the handle 10. Thus, when the handle 10 is turned, so is the exterior actuator arm 18. Note the threaded inserts that allow fasteners to attach the exterior actuator arm 18 to the handle 10.

Figure 13:
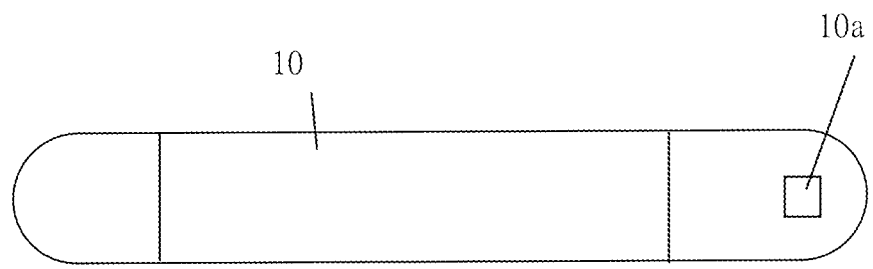
FIG. 13 is a top detail view of the interior handle.
Figure 14:
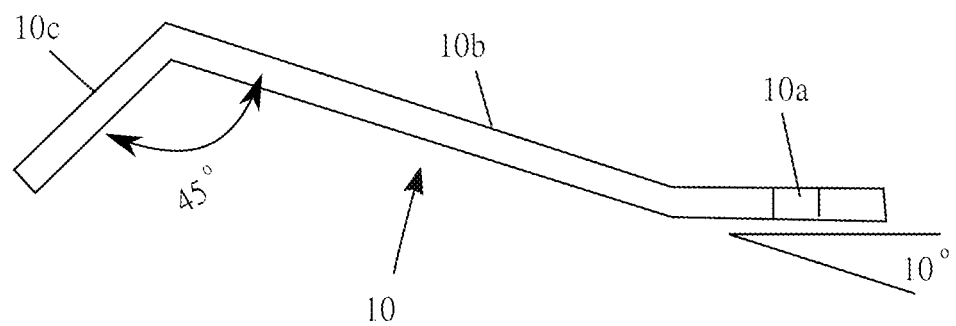
FIG. 14 is a side view of the interior handle.

FIG. 13 is a top detail view of the interior handle 10. FIG. 14 is a side view of the interior handle. As shown, the handle 10 is a rectangular shape with rounded edges. A hole 10a is provided to attach the handle to the pivot shaft 19.

FIG. 14 is a side detail view of the handle 10 Note that the handle 10 is also angled as shown. The hole area is flat. The shaft 10b extends back at an angle of 10° as shown. The end of the handle 10c is angled back at a 45° angle. This allows a user to easily grasp the handle in an emergency.

Figure 15:
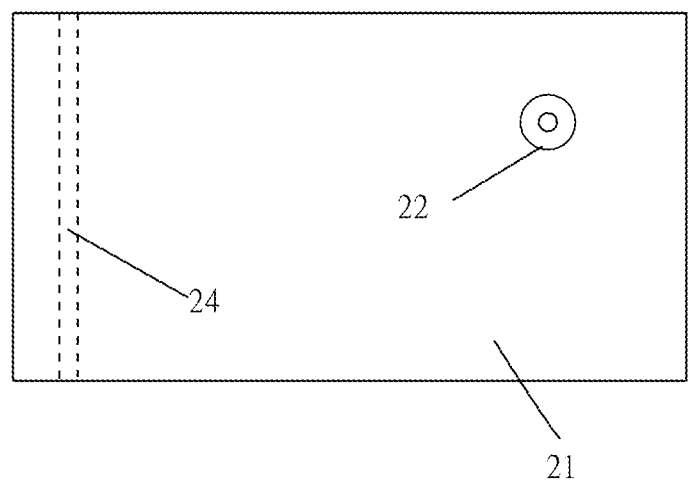
FIG. 15 is a top view of the support plate.
Figure 16:
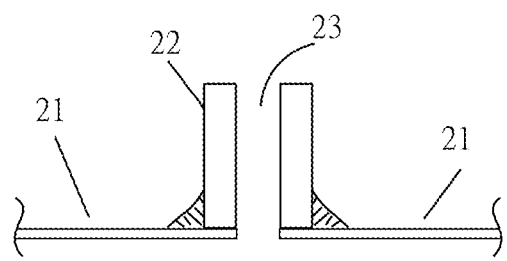
FIG. 16 is a side cross-section of the bushing attached to the support plate.
Figure 17:
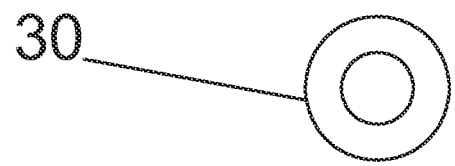
FIG. 17 is a front view of a spacer used with the system.

FIG. 15 is a top view of the support plate 21. As shown in FIG. 17, this plate 21 is installed on the inner surface of the outer side wall of the fuselage. The support plate 21 has a bushing 22 attached. The support plate 21 has a flange 24 formed in it. This flange is designed to fit over the flange installed in the side wall of the plane. Dimensions will vary depending on the type of plane. FIG. 16 is a side cross-section of the bushing 22 attached to the support plate 21. The bushing is welded to the plate as shown. Note the hole 23. This hole is where the pivot shaft 19 passes through from the inside of the plane to the outside. The support plate 21 is made of 5052 aluminum. The bushing 22 is made of 6061-t6 aluminum.

Figure 18:
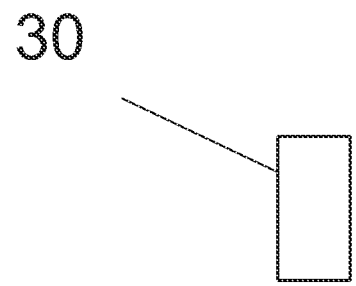
FIG. 18 is a side view of the spacer used with the system.
Figure 19:
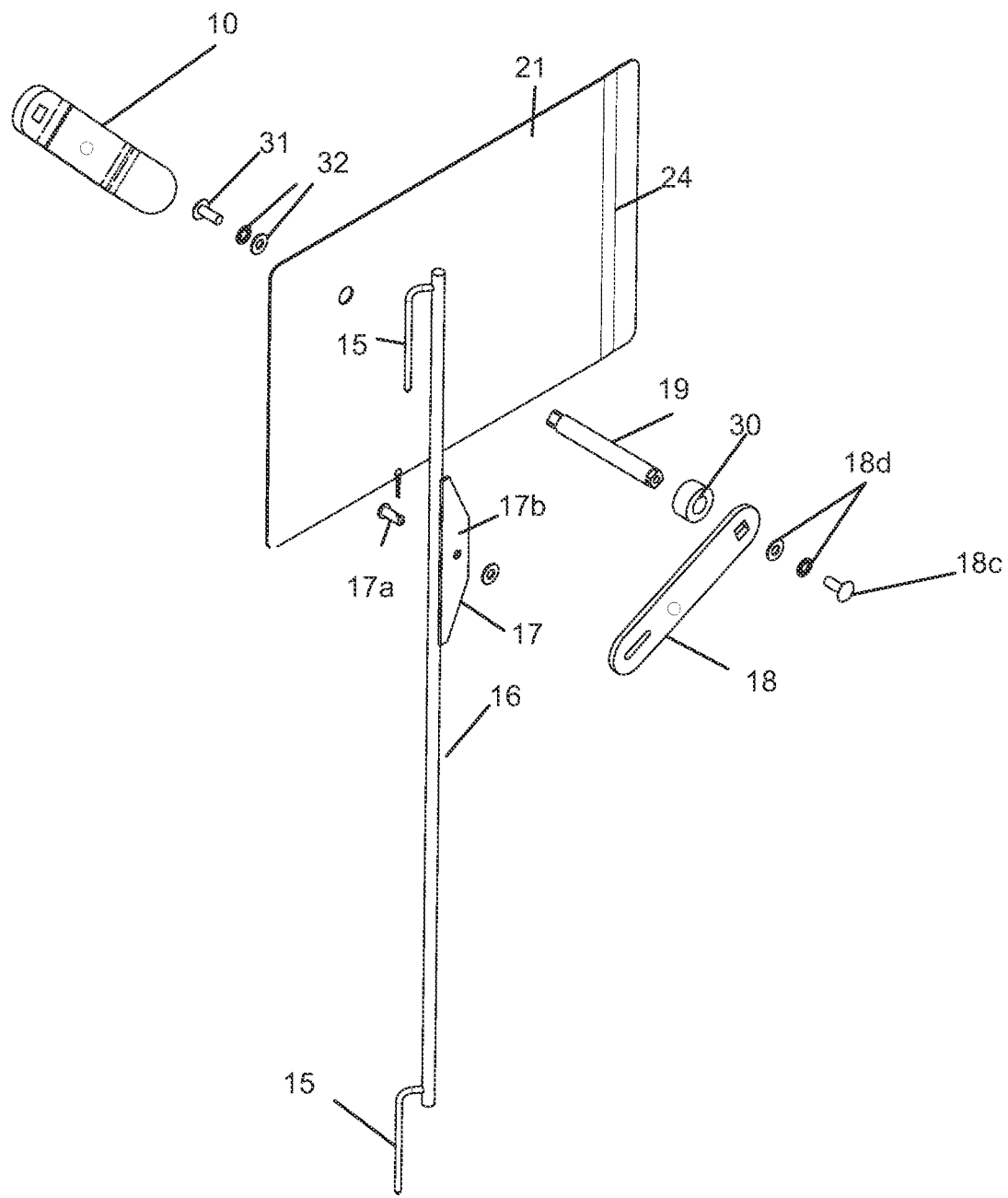
FIG. 19 is an exploded view of the components of the system.

FIG. 17 is a front view of a spacer used with the system. FIG. 18 is a side view of the spacer used with the system. These figures show a spacer 30 that is placed between the exterior actuator arm 18 and the pivot shaft 19, as shown in FIG. 19. The spacer is designed to be size adjusted as needed to fit a particular aircraft design.

FIG. 19 is an exploded view of the components of the system. Here, the major system components are shown. The handle 10 is secured to the pivot shaft 19 with a screw 31 and washers 32. The handle 10 is connected to the pivot shaft 19 through the support plate 21 as shown. The other end of the pivot shaft 19 is connected to the exterior actuator arm 18 with a screw 18c and washers 18d. The exterior actuator arm 18 is then connected to the door shaft activator bracket 17, which is welded to the release bar 16, as discussed above, with a screw 17a and a washer 17b and a nut (not shown).

Details of the full operation of the system are discussed below.

Figure 20:
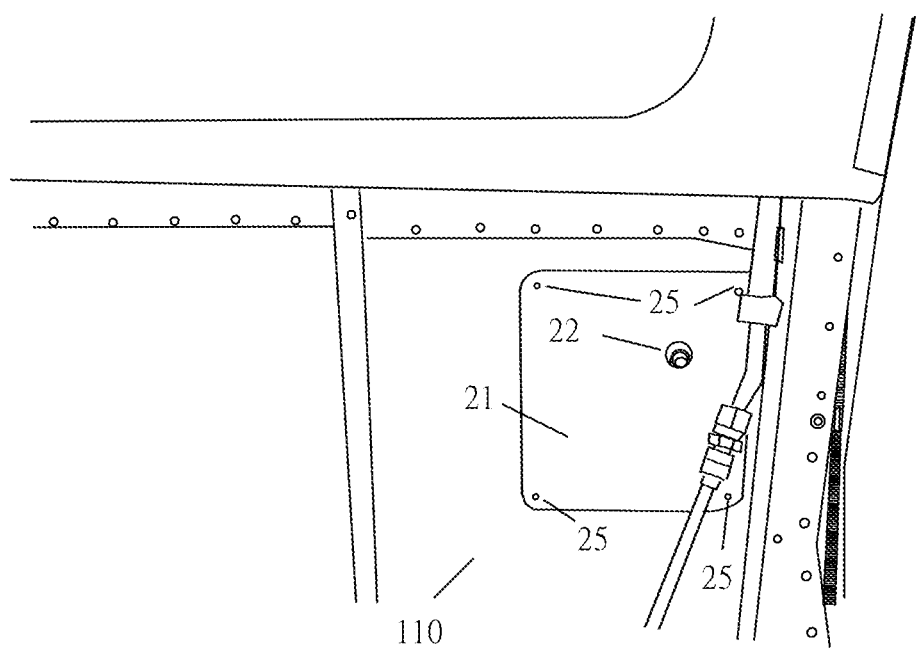
FIG. 20 detail of support plate installed in plane.

FIG. 20 detail of the support plate installed in plane. Here, a section of the inner wall covering has been removed to show the inner wall of the outer fuselage 110. The support plate 21 is shown installed with rivets 25. Note that this figure is looking at the back of the support plate. In this way, the bushing 22 passes through the wall of the fuselage 110 to provide support for the pivot shaft 19 as it passes through the wall of the fuselage. Once in place, the gray interior upon which the white "open" placard is attached, is part of the aircraft interior piece and is installed over the plate and bushing so that it appears as shown in FIGS. 1, 2 and 3.

The last three figures show the exterior of the device installed on a Cessna 206. Details of the system in operation are shown.

Figure 21:
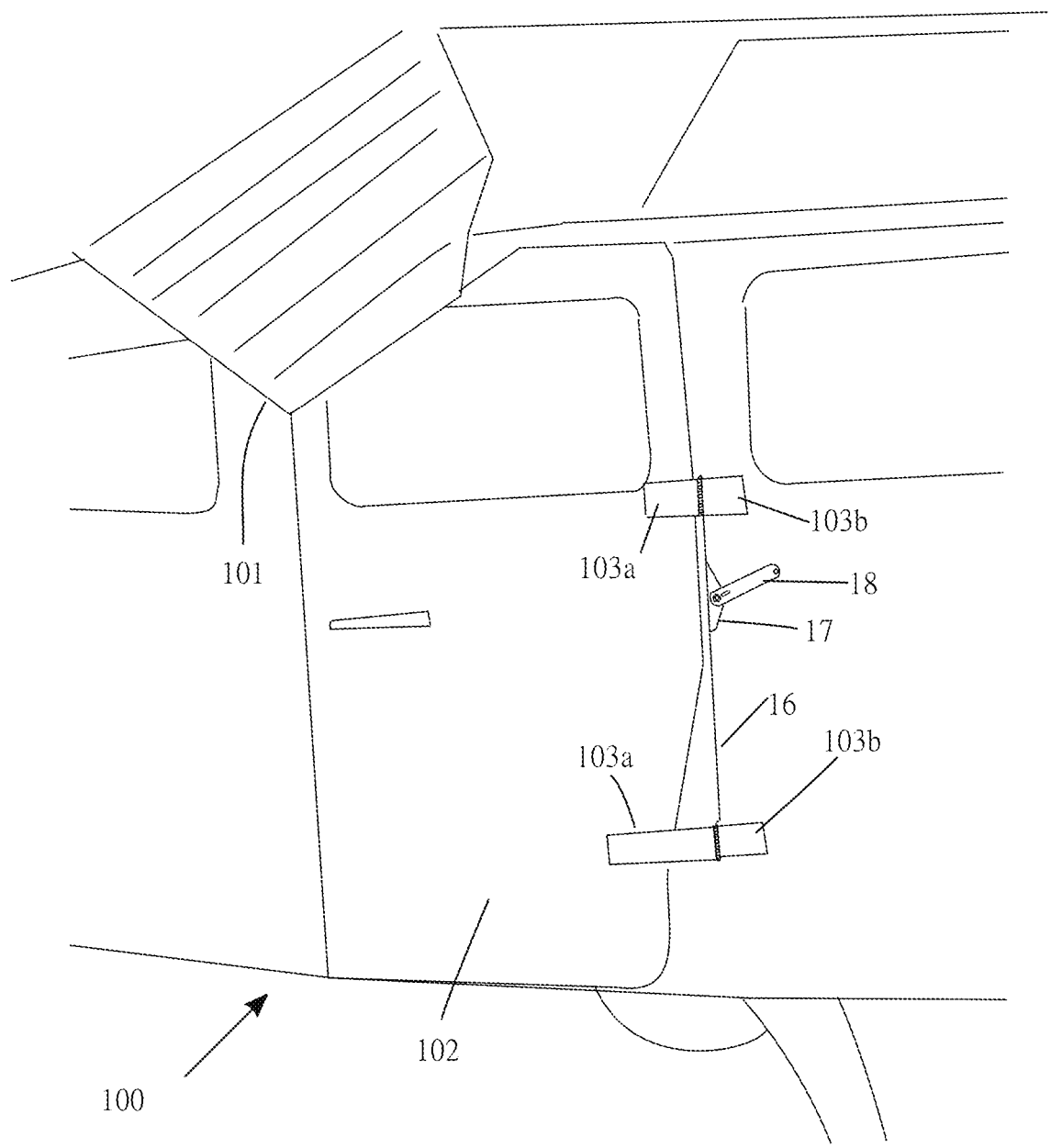
FIG. 21 is a side view of a Cessna 206 showing the flaps down, the front passenger door blocked and the Passenger Door Rapid Emergency Egress System installed in the safe position.

FIG. 21 is a side view of a Cessna 206 showing the flaps down, the front passenger door blocked and the PDREE System installed in the safe position. In this figure, the plane 100 has wing flaps 101 and a passenger door 102. The door has two hinges. Each hinge has a door part 103a and a fuselage part 103b that are normally held together by pins (not shown). The external components of the PDREE system are shown installed in the safe position. The original hinge pins have been replaced by the pins 15, which are not visible in the safe position. The release bar 16 is shown as well as the door shaft activator bracket 17 and the exterior actuator arm 18. Note that in this view, with flaps 101 extended, the door 102 cannot open.

Figure 22:
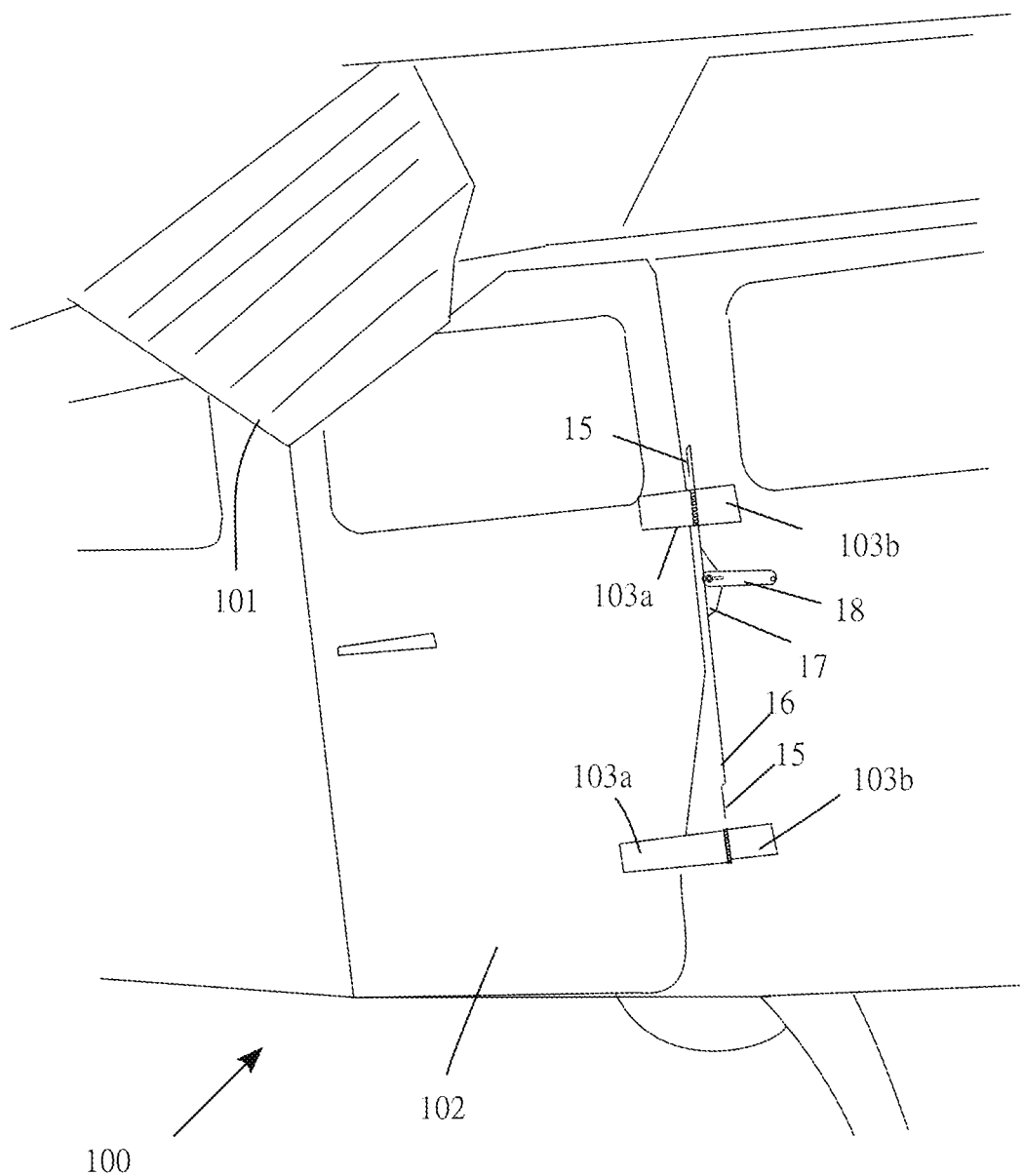
FIG. 22 is a side view of a Cessna 206 showing the flaps down, the front passenger door blocked and the Passenger Door Rapid Emergency Egress System installed in the intermediate position.

FIG. 22 is a side view of a Cessna 206 showing the flaps down, the front passenger door blocked and the PDREE System installed in the intermediate position. In this figure, the operating handle 10 has been partially rotated. Commensurate with the rotation, the exterior actuator arm 18 has also rotated upwards. Because it is connected to the door shaft activator bracket 17, which is in turn connected to the release bar 16, the release bar has been raised. As a result, the pins 15 are shown removed.

Figure 23:
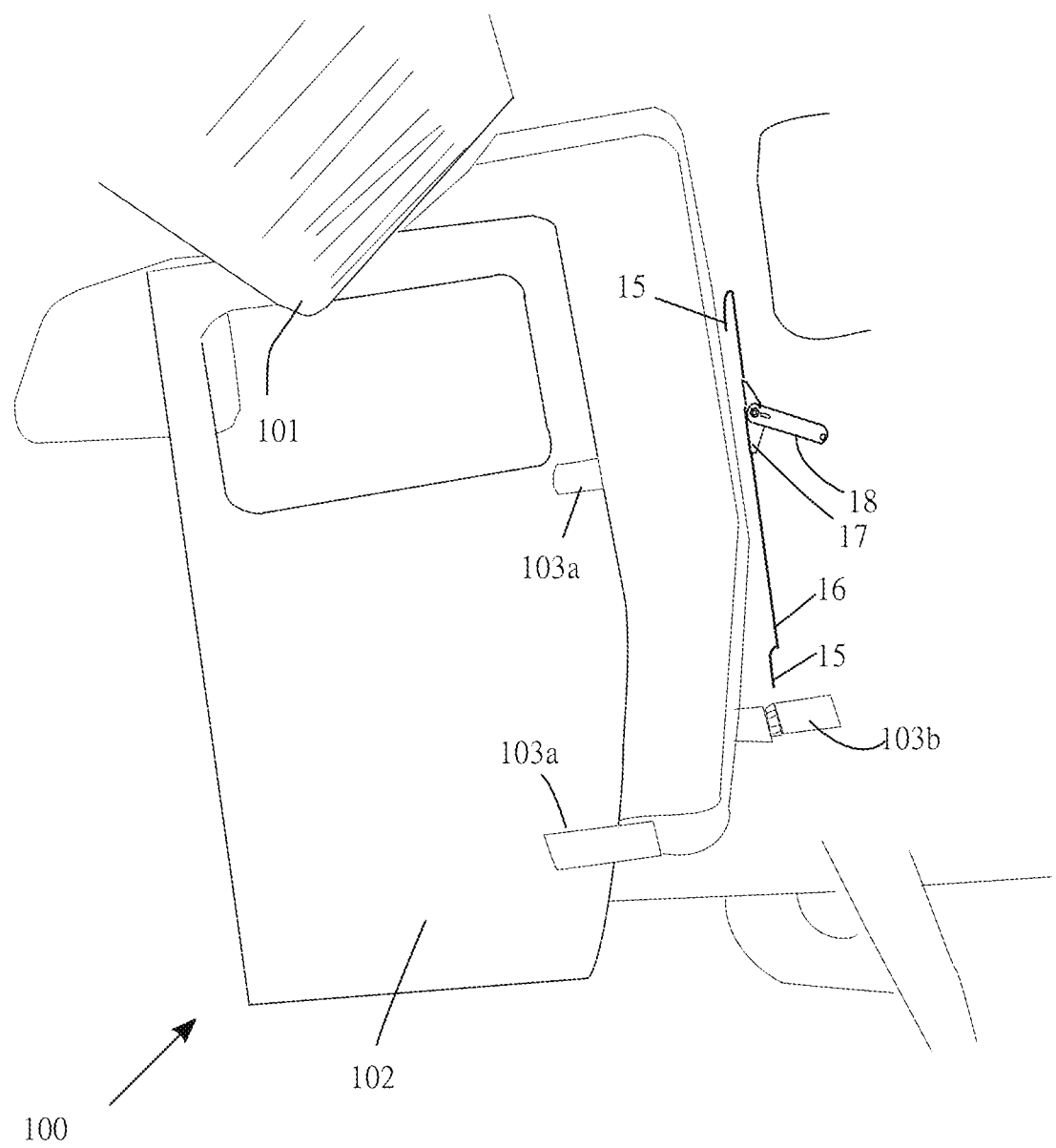
FIG. 23 is a side view of a Cessna 206 showing the flaps down, the front passenger door blocked and the Passenger Door Rapid Emergency Egress System installed in the fully open position and the front passenger door jettisoned.

FIG. 23 is a side view of a Cessna 206 showing the flaps down, the front passenger door blocked and the PDREE System installed in the fully open position and the front passenger door jettisoned. In this figure, the exterior actuator arm 18 is shown completely rotated. The pins 15 are shown completely removed from the hinges 103. The door 102 is shown falling away once the hinge pins 15 are fully removed from the hinges 103. As shown, the door is removed even though the flap 101 is still extended. Once the door has been jettisoned, passengers can easily egress from the airplane through the door opening.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. An airplane passenger door rapid emergency egress system for an aircraft having a rear door having an inside surface, and having at least two hinges having openings therein to receive a pair of pins, comprising:
    a) a handle, mounted inside said aircraft on an inner surface of said rear door;
    b) a pivot shaft having a proximate and a distal end, the proximate end of said pivot shaft being attached to said handle, said pivot shaft passing through said rear door to an exterior surface of said rear door;
    c) an exterior actuator arm having a first end and a second end, whereby the first end of said exterior actuator arm is attached to the distal end of said pivot arm; and
    d) a release bar having a top end and a bottom end and a center portion, whereby said exterior actuator arm is slidably attached to said center portion of said release bar by a means for holding the exterior actuator arm, fixedly attached to said release bar, said release bar having at least two pins such that one of said at least two pins is attached to the top end of said release bar and the second of said at least two pins being attached to the bottom end of said release bar; and
    e) wherein said at least two pins on said release bar are removably installed in said openings in said at least two hinges.

2. The airplane passenger door rapid emergency egress system of claim 1 wherein said release bar has a first position and a second position.

3. The airplane passenger door rapid emergency egress system of claim 2 wherein said release bar is in said first position, said pair of pins are within said openings in said at least two hinges on said rear door, and when said release bar is in said second position, said pair of pins are removed said openings in said at least two on said rear door.

4. The airplane passenger door rapid emergency egress system of claim 2 wherein when said release bar in in said first position, said handle is in a first position and when said release bar is in said second position, said handle is in a second position.

5. The airplane passenger door rapid emergency egress system of claim 1 further comprising a removable plastic cover, positioned over said handle.

6. The airplane passenger door rapid emergency egress system of claim 1 further comprising a placard positioned behind said handle and attached to said inside surface of said rear door.

7. The airplane passenger door rapid emergency egress system of claim 6 wherein said placard has the word "OPEN" formed thereon and an arrow indicating how the handle is to be used also formed thereon.

8. The airplane passenger door rapid emergency egress system of claim 7 wherein the placard is painted white and the word "open", the arrow and the handle are painted red.

9. The airplane passenger door rapid emergency egress system of claim 1 wherein the means for holding the exterior actuator arm, fixedly attached to aid release bar comprise a bracket having a hole therein, said bracket being welded to said release bar.

10. A method of egress from the rear section of an airplane through a rear door having an inside surface, and having at least two hinges having openings therein to receive a pair of pins; a handle, mounted inside said aircraft on an inner surface of said rear door; a pivot shaft having a proximate and a distal end, the proximate end of said pivot shaft being attached to said handle, said pivot shaft passing through said rear door to an exterior surface of said rear door; an exterior actuator arm having a first end and a second end, whereby the first end of said exterior actuator arm is attached to the distal end of said pivot arm; and a release bar having a top end and a bottom end and a center portion, whereby sad exterior actuator arm is slidably attached to said center portion of said release bar by a means for holding the exterior actuator arm, fixedly attached to aid release bar, said release bar having a pair of pins such that one of said pair of pins is attached to the top end of said release bar and the second of said pair of pins being attached to the bottom end of said release bar; and wherein said pair of pins on said release bar are removably installed in said openings in said at least two hinges comprising the steps of:
   a) raising the handle upwardly, thereby rotating the exterior actuator bar;
   b) raising the release bar as a result of raising the exterior actuator bar until said pins on said release bar are completely removed from said at least two hinges; and
   c) pushing the door from the airplane.

\* \* \* \* \*